March 20, 1973 N. G. GOUDREAU 3,721,416
LOADING BALANCER

Filed Dec. 4, 1970 2 Sheets-Sheet 1

Inventor:
Noel G. Goudreau
By Hofgren, Wegner,
Allen, Stellman & M<sup>c</sup>Cord
Att'ys

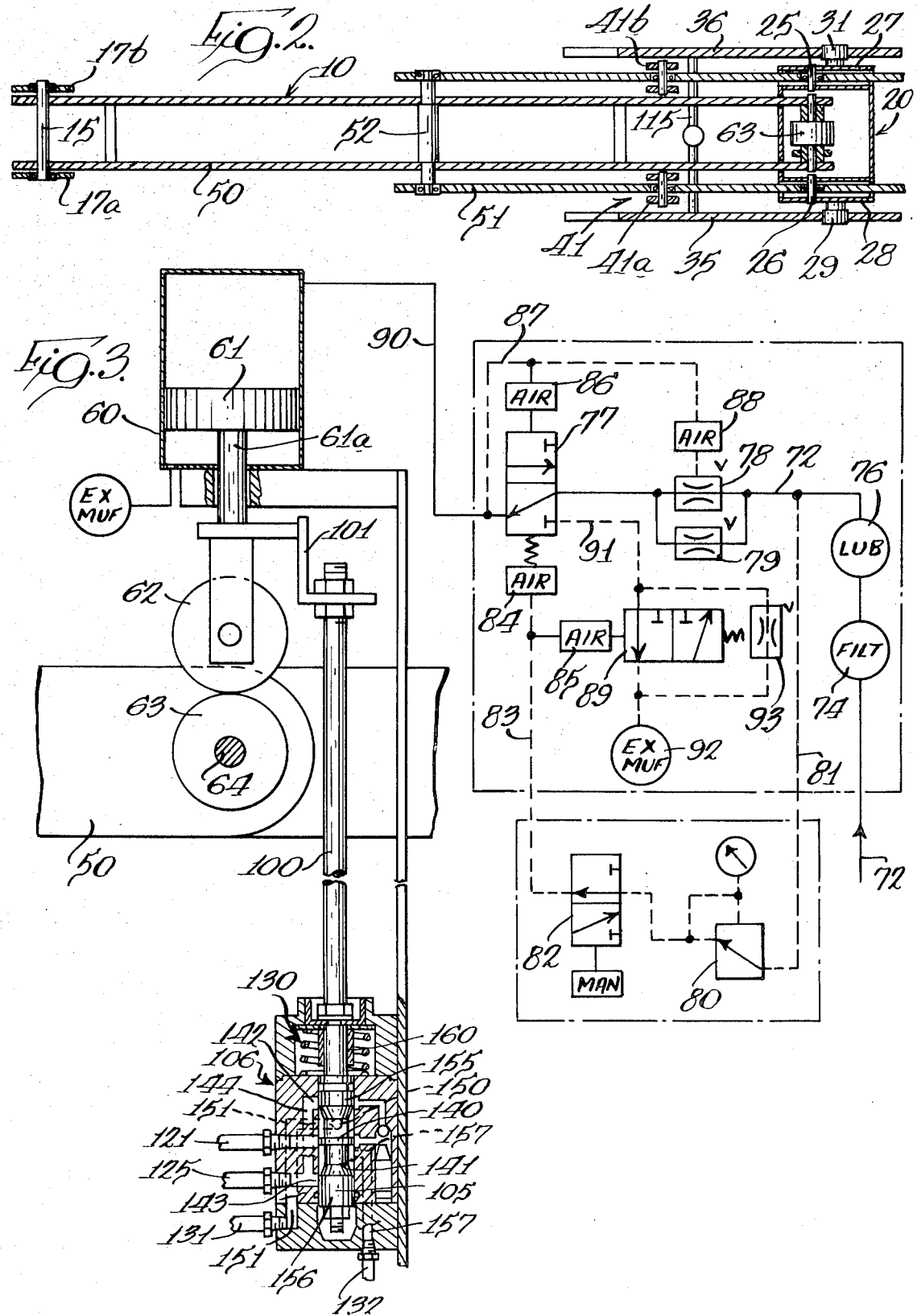

United States Patent Office 3,721,416
Patented Mar. 20, 1973

3,721,416
LOADING BALANCER
Noel G. Goudreau, Mendota, Ill., assignor to Conco Inc.
Filed Dec. 4, 1970, Ser. No. 95,045
Int. Cl. A47f 5/00
U.S. Cl. 248—325                             13 Claims

ABSTRACT OF THE DISCLOSURE

A loading balancer having a two-stage balancing control for the multi-arm balancing system wherein a first stage is sensitive to a force applied to a load on the load support arm to control a second stage control having sufficient power to adjust the position of the load and the balancer mechanism in the same direction as the applied force.

BACKGROUND OF THE INVENTION

This invention pertains to a loading balancer wherein a load can be supported in a desired location in space and which has power assist mechanism to reposition the load in space in response to the application of a slight amount of force to the load.

Applicant's assignee, for several years, has been manufacturing loading balancers of the type shown in Pat. Nos. 3,259,351 and 3,402,911. These loading balancers have embodied a parallelogram arm system with a balancing control circuit including a fluid cylinder operatively associated wtih the parallelogram arm system to balance the weight of the load and adjustable to retain the load in any manually adjusted position in space within the range of the loading balancer. Most commonly, these control circuits have used air which, at available pressures in factories, limits the maximum force available for balancing of a load when used with an air cylinder of any practical size. This maximum load limit has not permitted the use of the loading balancer with loads of 1,000 lbs. or more.

Applicant has overcome the deficiencies of the prior structures in handling heavier loads by providing a two-stage control wherein first stage balancing of the load and the balancer arm system is obtained through a fluid control and, more particularly, a pneumatic control including a piston and cylinder. This piston also constitutes a feeler responsive to the application of force to the load tending to move it from an initial position in space to another position to operate a second stage control having components with sufficient force capacity to move the load and balancer structure to a new position responsive to the force applied to the load. This second stage control preferably includes a hydraulic control circuit including a hydraulic piston and cylinder and a fluid pressure source providing pressures of a magnitude sufficient to provide sufficient force when used with a hydraulic cylinder of reasonable size.

SUMMARY

An object of this invention is to provide a new and improved loading balancer for handling loads of up to several thousand pounds and which positions the load in different positions responsive to the manual application of a light amount of force to the load.

Another object of the invention is to provide a loading balancer providing a two-stage control system wherein a first stage is used for balancing the load and the arms of the loading balancer and the second stage is used to physically position the load and the arms in the necessary position as required in response to the manual application of force to the load with only a slight amount of manual force being required for the loading balancer to respond in moving and positioning the load.

Still another object of the invention is to provide a loading balancer having a parallelogram arm system with one of the arms being a load support arm to which a load can be connected and with a second arm having a pair of pivotally interconnected arm sections with the arm sections having a normal position and pivotally movable therefrom one with respect to the other to provide a signal as to the direction of force applied to the load, a first control circuit includes a piston and cylinder with the piston and its rod defining a feeler member for yieldably urging the arm sections to the neutral position and for detecting the movement of the arm sections therefrom to provide a signal indicating the direction of the light force manually applied to the load, and a second control circuit including a piston and cylinder having a piston connected to a movable carriage of the loading balancer with the control thereof responding to the positioning of the feeler member to shift the carriage and the arm structure operatively connected thereto causing the balancer arms to adjust in the direction required to move the load in the direction of the force and to maintain the arms in a position to retain the load in position upon termination of application of the force.

BRIEF DESCRIPTION OF THE DRAWING

FIG. 2 is a plan section, on an enlarged scale, taken generally along the line 2—2 in FIG. 1;

FIG. 3 is a fragmentary side elevation, on an enlarged scale, with parts broken away, of a portion of the mechanism shown in FIG. 1 and with part of the control shown therein diagrammatically.

DESCRIPTION OF THE PREFERRED EMBODIMENT

Figures 1, 4:
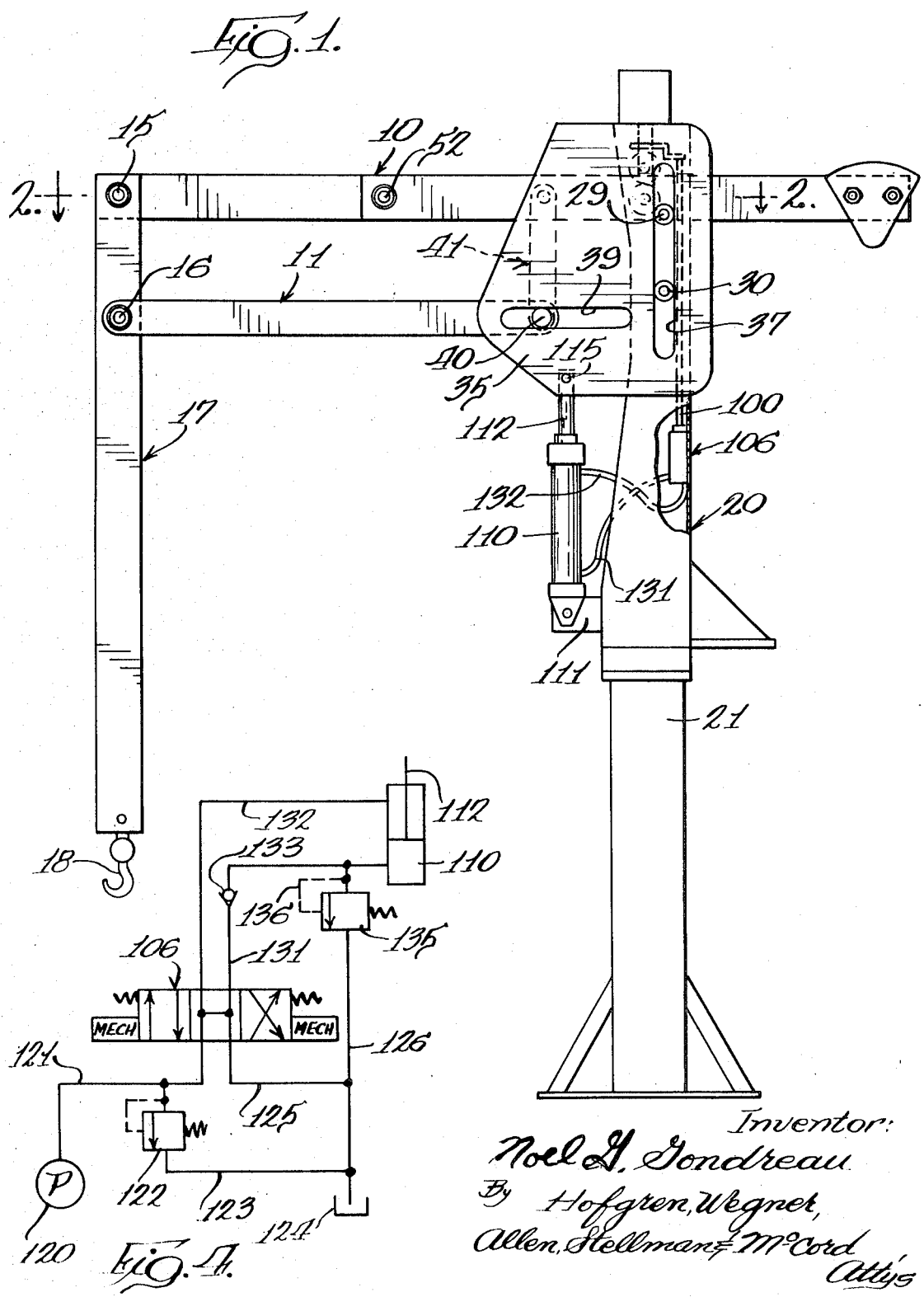
FIG. 1 is a side elevational view of the loading balancer shown on a pedestal support.
FIG. 4 is a symbol diagram of another part of the control circuit for the loading balancer.

The loading balancer has a parallelogram arm system generally of the same type as shown in Pat. No. 3,402,911 wherein a pair of vertically-spaced, parallel arms, indicated generally at 10 and 11, are each pivotally connected at one of their ends as by pivots 15 and 16, respectively, to a generally vertically extending load support arm 17. This arm has suitable means provided at the bottom thereof for connection of a load to the load support arm 17. As shown, this can be a hook 18 or, if desired, can be one of many different types of work holding fixture.

Each of the arms 10, 11 and 17 is formed of spaced-apart members, with the members 17a and 17b forming the load support arm 17, as shown in FIG. 2.

A frame, indicated generally at 20, is rotatable about a vertical axis on a pedestal 21 which is mounted to a floor support. Alternatively, the frame 20 can be suspended from an overhead stationary mounting or an overhead trolley, as shown in Pat. No. 3,402,911. The frame 20 pivotally mounts the upper arm 10 by a pair of pin and bearing pivots 25 and 26. These pin and pivot bearings are mounted in spaced-apart plates of the frame 20, as shown in FIG. 2, including the outermost plates 27 and 28. These latter plates of the frame 20 mount two vertically-spaced pairs of guide rollers, with the rollers 29 and 30 being mounted at the front of the balancer, as shown, and the other pair of rollers, one of which is shown at 31 in FIG. 2, being mounted at the rear of the balancer. These guide rollers guide a vertically movable carriage having spaced-apart plates 35 and 36 for movement relative to the frame 20. For this purpose, each of the plates 35 and 36 has a vertically extending slot, as shown by slot 37, which coacts with guide rollers 39 and 30. Each of the plates 35 and 36 also has a horizontally extending guide slot, as slot 39 shown in plate 35, which coacts with a guide roller 40 mounted at the lower end of one part 41a of a fourth arm 41 of the parallelogram arm system. Another guide roller similar to guide roller 40, not shown, is carried on a second part 41b of the fourth arm and coacts with the horizontal slot in the carriage plate 36.

The foregoing structure is of the same general type as shown in said Pat. No. 3,402,911 wherein the arms 10, 11, 17 and 41 define a parallelogram arm system with the arms taking relative positions as required for desired positioning of the load supported on the load support arm 17. A change in disposition of the arms results in locating a load within a vertical plane within the limits of movement of the parallelogram arm system, while this space becomes a cube because of the rotation of the frame 20 on the pedestal 21.

The loading balancer disclosed herein has a modified upper arm 10 which is actually formed of arm sections 50 and 51 pivotally interconnected by a pivot pin 52 extending through the spaced-apart plates of each of the arm sections. The arm sections 50 and 51 have a normal in-line neutral position with each other, as shown in FIG. 1, which is maintained by structure including a control circuit, shown particularly in FIG. 3, and including a cylinder 60 having a piston 61 and piston rod 61a with a follower roller 62 at the lower end thereof. This follower roller follows a roller 63 carried at an end of the upper arm section 50, as shown in FIG. 2. With the arm sections 50 and 51 in neutral in-line position, the axis of the roller 63 and the mounting pin 64 therefore is in line with the pin and pivot bearings 25 and 26 which mount the upper arm and interfit with the upper arm section 51.

With the initial placement of the load on the load support arm 17, there will be a resulting pivoting of the arm sections 50 and 51, relative to each other, to raise the roller 63 and shift the follower roller 62 upwardly. Through the circuit shown in FIG. 3 in association with the cylinder 60, pressure can be supplied to the head end of the cylinder to approximately balance the force resulting from placing a load on the load support arm 17. This circuit is a fluid circuit and preferably a pneumatic circuit, such as shown in Pat. No. 3,259,352. This circuit includes a pressure inlet line 72 having a filter 74 and an air lubricator 76 therein, with the line 72 extending to a control valve 77 by communication through a pair of flow restricting orifices 78 and 79 in parallel, with the orifice valve 79 having a fixed restriction, while the orifice valve 78 has a variable restriction under the control of the air pressure in the head end of the cylinder 60. The pressure maintaned in the head end of the cylinder 60 is set by an adjustable pressure-setting valve 80 connected in a branch line 81 from the inlet line 72 and with the outlet of the pressure regulating valve connected to a toggle valve 82 which, in the position shown, connects the air at a pre-set pressure to a line 83 leading to the pilot sections 84 of the valve 77 and 85 of a valve 89. The pilot section 84 of the valve 77 opposes a pilot section 86 of the valve which communicates with the head end of the cylinder through a line 87, with this line also extending to a pilot 88 for the variable orifice valve 78.

The pressure set by the valve 80 is transmitted to the pilot 84 and this pilot acts against the pressure in the head of the cylinder as applied to pilot 86 to resultingly position the valve 77. The valve 77 can connect inlet pressure supplied by line 72 to a line 90 leading to the head end of the cylinder or can connect the line 90 to a line 91 leading to the valve 89. The valve 89 normally is in the position shown in FIG. 3 when air is applied to the pilot 85 thereof whereby the line 91 connects to an exhaust muffler 92. However upon release of air pressure in pilot 85, the valve shifts under the urging of a spring to a position wherein the passage through the valve is blocked and there can only be exhaust at a slow rate through an orifice valve 93.

In initial loading of the balancer, the pressure regulating valve 80 is adjusted to provide sufficient pressure at the head end of the cylinder to maintain the piston 61 in a position to hold the roller 63 and the arm sections in normal position.

During operation, when a force is applied to the load in a direction having a downward component, the arm section 50 pivots to raise the roller 63 to urge the piston 61 upwardly, which increases the pressure in the head end of the cylinder which, through pilot 86, shifts the valve 77 to bleed air through the line 90 until the pressures at pilots 84 and 86 again balance. If the applied force to the load has an upward component, the arm section 50 pivots to lower the roller 63, with the result that the piston rod 61a extends to lower the pressure in the head end of the cylinder 60 with the result that the greatest pressure in pilot 84 shifts the valve 77 to connect the pressure line 52 to the head end of the cylinder to bring the pressure therein back to the set value.

The foregoing system provides a first stage control for the load with utilization of pneumatic circuitry which can operate at line pressure normally found available in a factory. This system, with the relative free movement of the piston 61 from a neutral position, provides means for detecting a force manually applied to the load or to the load support arm 17 to determine the direction of the manually applied force and resulting apply forces to the entire balancer to cause the balancer to move and physically position the load in response to the application of force. This piston 61 defines a force feeler or detector for the second stage control.

The detection by feeler piston 61 is transmitted by means of a link 100 which is connected to the piston rod 61a by an attaching bracket 101, as shown in FIGS. 1 and 3. The lower end of the link is connected to a valve member 105 of a control valve of the second stage control, indicated generally at 106.

The control valve 106 is in a control circuit including a fluid cylinder 110 mounted at its lower end to a bracket 111 affixed to the frame 20 and having a piston rod 112 which extends upwardly and is fastened to a cross pin 115 extending between the carriage plates 35 and 36. The piston rod 112 physically positions the carriage at a vertical elevation relative to the frame 20 and through the connection by the horizontal guide slots including slot 39 engaging the rollers 40 on arms 41a and 41b resultingly positions the parallelogram arm structure about the pin and pivot bearings 25 and 26 which mount the upper arm 10 to the frame 20.

With the load support arm 17 supporting a load and with a force applied thereto having an upward component, the arm section 50 pivots downwardly about the pivot 52, with the result that the piston rod 61a extends. This causes movement of the link 100 which modifies the position of the valve member 105 to actuate the cylinder 110 and extend the piston rod 112 which raises the carriage and correspondingly causes the parallelogram arms to shift to raise the load support arm 17.

Conversely, a force applied to the load having a downward component causes retraction of the piston feeler 61 to shift the valve member 105 in the opposite direction and cause retraction of the piston rod 112 which lowers the carriage and resultingly causes shift of the parallelogram arms to have the load support arm 17 lower.

The control circuit including the valve 106 and cylinder 110 utilizes fluid, preferably hydraulic fluid, which can have a pressure of a magnitude to result in total forces applied to the carriage which still require only a moderate size for the cylinder 110. The hydraulic circuit is shown in particular in FIG. 4, with the control valve 106 shown in detail in FIG. 3. The motor driven pump 120 supplies fluid to a line 121 having a relief valve 122 connected thereto, with the relief valve having an outlet 123 connected to tank 124. The valve member 105 has an open center position wherein fluid can flow through the valve 106 to a line 125 connecting to a tank line 126. The valve member 105 is maintained in the open center position by a spring-centering mechanism, indicated generally at 130.

A pair of outlet ports in the valve body connect to lines 131 and 132, with the line 131 extending to the head end of the cylinder 110. The line 132 extends to the rod end of the cylinder 110. The line 131 has a check valve 133 which permits free flow from the valve to the head end of the cylinder but blocks reverse flow. The tank line 126 connects to the line 131 and has a counterbalance valve 135 in said line and which takes a pressure signal through a pilot line 136 to open the counterbalance valve in response to a pressure which overcomes a spring acting on the counterbalance valve to maintain it closed.

More particularly, the control valve 106, as shown in the open center position in FIG. 3, has inlet flow through line 121 pass to either side of a central valve land 140 and flow in both directions through a central valve bore 141 to ports 142 and 143 which, by a connecting passage 144, both communicate with the tank line 125. When the link 100 is lowered by extension of the piston rod 61a, the valve member 105 shifts downwardly to have the central land 140 block flow downwardly, as viewed in FIG. 3, while flow to cylinder line 131 occurs through a port 150 which is connected to the cylinder line 131 by drilled passages 151 in the valve body. The land 155 on the valve member has blocked the passage 144, while a land 156 on an opposite end of the valve member has moved to a position to connect a passage 157 in the valve body through the central valve bore with the port 143 connected to the tank line 125. This connects cylinder line 132 to tank.

If the link 100 is shifted upwardly in response to retraction of the piston rod 61a, the valve member 105 moves upwardly from the neutral, open-center position, shown in FIG. 3, with the result that the central land 140 moves upwardly and pressure through line 121 connects with the passage 157 in the valve body which supplies pressure fluid to the line 132 extending to the rod end of the cylinder. At the same time, the land 155 has moved upwardly to connect the passage 151 and port 150 to the passage 144 connected to the tank line 125 whereby the cylinder line 131 is connected to tank.

The counterbalance valve 135 assures that the head end of the cylinder will maintain fluid under pressure to maintain the parallelogram arms and the load in a desired position until such time as pressure is directed to either the rod or head end of the cylinder 110 to effect a change of position of the carriage and the parallelogram arms. Upon applying pressure to the rod end through line 132, the pressure builds up in the head end until the setting of the spring of the counterbalance valve is exceeded, with the result that the counterbalance valve can open to permit exhaust of fluid to tank from the head end of the cylinder. Conversely when pressure is applied to the head end of the cylinder, the setting of the counterbalance valve is such as to remain closed and permit application of pressure to the cylinder to raise the piston rod 112.

In operation of the loading balancer, the unit is connected to sources of fluid pressure and, with the specific disclosure contained herein, both air and hydraulic systems. The load support arm 17 is engaged with a load. The operator adjusts the pressure setting valve 80 of the pneumatic circuit slightly beyond the necessary pressure to move the piston feeler 61 past the neutral position which causes downward pivoting of the upper arm section 50. This shifts the valve 106 to cause movement of the carriage until a balanced condition is achieved wherein the load is supported in space and the arm sections 50 and 51 are in their normal, in-line position with the pressure in cylinder 60 slightly reduced to an amount to maintain this condition.

With the manual application of force to the load, the arm section 50 pivots with respect to the arm section 51 to cause corresponding movement of the piston rod 61a. This movement is limited by a collar 160 in the valve 106. This movement can occur with the application of a slight force because of the balanced condition of the arm sections 50 and 51 and with only slight force being required to shift the piston rod 61a. As described, this shift of the piston rod 61a positions the valve member 105 of the valve 106 to correspondingly actuate the cylinder rod 112. The carriage is adjusted through movement of the cylinder rod 112 to shift the relation of the parallelogram arms for desired load positioning. When this is obtained, the operator holds the load fixed in space and with slight further movement of the carriage the arm sections 50 and 51 move back to a normal, in-line position and the piston rod 61a moves back to its neutral position. This brings the valve 106 back to normal, open-center position. The cylinder 110 then maintains the entire system in the then-existing location in space until a further force is applied to the load.

Pneumatic circuitry preferably can be used to bring the parallelogram arm system into balance, while hydraulic circuitry having higher pressures preferably can be used to position the etire system and the load in space and maintain the desired position.

What is claimed is:

1. A loading balancer comprising, a parallelogram arm system for balancing a load in all positions thereof within a work cube of substantial dimensions, one of said arms being formed of two pivotally interconnected arm sections and pivotal with respect to each other from a normal orientation to indicate a force manually applied to the load to change the location of the load within the work cube, means for detecting said relative pivotal movement, and means connected to said system to support the system in a fixed position under load and operable in response to actuation of said detecting means to move the arm system to a new position and to maintain the system in the new position.

2. A loading balancer as defined in claim 1 wherein said detecting means includes a movable feeler movable with one of said arm sections and said system supporting means includes a fluid motor operable by movement of said feeler.

3. A loading balancer as defined in claim 2 wherein said movable feeler is a piston and has a normal position holding said arm sections in normal orientation, and a fluid circuit including a cylinder for said piston adjustable to exert sufficient fluid pressure on the piston to maintain said arm sections in normal orientation against the weight of the load.

4. A loading balancer comprising, a frame, a load support arm movably mounted on said frame, a power cylinder operatively connected to said arm to act against a load connected to said arm, a first fluid circuit including said cylinder and a control valve to position said arm and load in a desired position and maintain said position, means mounting said load support arm for a limited range of detecting movement to either side of a neutral position in response to a manually applied light force and independently of the position of the load support arm maintained by said power cylinder, detector means independent of said power cylinder for yieldably holding said load support arm in said neutral position and movable in response to said detecting movement, and interconnecting means between said detector means and said control valve whereby said control valve is operated in response to movement of said detector means to shift said control valve to actuate said cylinder and cause said load support arm to move in the direction of said applied force.

5. A loading balancer having a load support arm, a pair of vertically spaced arms each pivotally connected at one end to said load support arm, and a fourth arm pivotally connected to said spaced arms whereby said arms define a parallelogram, a supporting frame pivotally mounting one of said spaced arms, a movable carriage operatively and movably connected to another of said arms and movable relative to said frame: the improvement comprising, a hydraulic piston and cylinder connected to said carriage to hold said carriage in position, a hydraulic control circuit including said piston and cylinder operable to shift said carriage relative to said frame to change the orientation of said arms, means mounting said load support arm for limited movement in response to a manually applied light force without movement of said carriage and hydraulic piston and cylinder, and detecting means operable independently of said hydraulic control circuit and responsive to said light force applied to a load on the support arm to operate said control circuit and shift said carriage relative to the frame.

6. A loading balancer as defined in claim 5 wherein said detecting means includes a feeler piston having a neutral position as controlled by a pneumatic circuit including a cylinder for the feeler piston, and one of said spaced arms being formed of pivotally connected arm sections and said feeler piston movable with one of said arm sections.

7. A loading balancer as defined in claim 6 wherein said pneumatic circuit includes means to vary the air pressure in the cylinder for the feeler piston to set up said neutral position at any load value to the maximum rating of the balancer.

8. A loading balancer having a load support arm, a pair of vertically spaced arms each pivotally connected at one end to said load support arm, and a fourth arm pivotally connected to said spaced arms whereby said arms define a parallelogram, a supporting frame pivotally mounting one of said spaced arms, a movable carriage operatively and movably connected to another of said arms and movable relative to said frame: the improvement comprising, said one spaced arm which is pivotally mounted to the frame being formed of two pivotally interconnected sections to pivot relative to each other to either side of a neutral in-line relation, one arm section having an end aligned with the pivotal mounting to the frame, a piston feeler on said frame and movable with said end, a fluid circuit including a cylinder for said piston feeler and an adjustable pressure source whereby said piston feeler can assume a neutral position which places said arm sections in-line regardless of the weight of a load, a second fluid cylinder having a piston connected to said carriage, and a control fluid circuit for said second piston and cylinder responsive to movement of said feeler piston when a light force is applied to the load to shift said carriage to cause the parallelogram arms to move in the direction of said light force.

9. A loading balancer as defined in claim 8 wherein said first mentioned fluid circuit is pneumatic and said second control fluid circuit is hydraulic.

10. A loading balancer as defined in claim 8 wherein said control fluid circuit includes a control valve which is shifted in response to movement of the feeler piston.

11. A loading balancer as defined in claim 8 wherein said first fluid circuit includes a pressure adjusting valve whereby the pressure applied to said feeler piston is adjusted to balance the weight of the load tending to move said arm sections from an in-line relation and with any force applied to the load either up or down acting through said pivoted arm sections to move them out of line with the result that the piston feeler is shifted to actuate said second fluid cylinder and shift the carriage to move the parallelogram arms.

12. A loading balancer comprising, a parallelogram arm system for balancing a load in all positions thereof within a substantial range of positions, one of said arms being formed of two pivotally interconnected parts and pivotal with respect to each other from a normal orientation to indicate a force manually applied to the load to change the location of the load, means for detecting said relative pivotal movement, and means connected to said system to support the system in a fixed position under load and operable in response to actuation of said detecting means to move the arm system to a new position and to maintain the system in the new position.

13. A loading balancer as defined in claim 12 wherein said detecting means comprises a piston in a pneumatic cylinder, said system moving means includes a hydraulic cylinder controlled by a valve, and said valve being operable by said piston.

References Cited

UNITED STATES PATENTS

| | | | |
|---|---|---|---|
| 2,572,910 | 10/1951 | Brown | 248—371 |
| 2,872,200 | 2/1959 | Kroll | 248—371 |
| 2,893,134 | 7/1959 | Shea et al. | 248—371 |
| 3,341,165 | 9/1967 | Taylor | 248—376 |

MARION PARSONS, JR., Primary Examiner